UNITED STATES PATENT OFFICE.

THOS. J. MAYALL, OF ROXBURY, ASSIGNOR TO HIMSELF AND GEORGE N. DAVIS, OF BOSTON, MASSACHUSETTS.

IMPROVEMENT IN THE MANUFACTURE OF HARD RUBBER.

Specification forming part of Letters Patent No. 22,218, dated November 30, 1858.

*To all whom it may concern:*

Be it known that I, T. J. MAYALL, of Roxbury, in the county of Norfolk and State of Massachusetts, have invented a certain Improvement in the Manufacture of Hard Vulcanized India-Rubber, of which the following is a full, clear, and exact description.

The "hard vulcanized rubber" now used in the manufacture of combs and a variety of other articles formerly made of bone and horn is liable to the objection that with a certain degree of elasticity it unites a brittleness which greatly diminishes its value as a material and the usefulness and durability of the articles made from it.

To remove this brittleness and to give to the rubber a greater degree of toughness, and consequently to increase its durability and multiply the uses to which it may be applied, is the object of my present invention, which consists in incorporating with the rubber previous to vulcanizing it a portion of olive-oil, which, without in the least impairing its elasticity, gives to it a peculiar strength and toughness not heretofore possessed by hard vulcanized rubber.

To enable others skilled in the art to understand my invention, I will proceed to describe the manner in which I have carried it out.

One pound of india-rubber is incorporated, by grinding, with five ounces of sulphur, and to the compound is added gradually as the grinding proceeds one ounce of olive-oil, the whole being thoroughly mixed and vulcanized in the usual manner. The article thus obtained possesses a peculiar toughness and tenacity, which adapts it in a remarkable degree for the manufacture of articles requiring elasticity and strength combined. Among the uses to which it is particularly applicable may be mentioned emery-wheels and sticks for polishing metallic articles, a suitable grit being united with the vulcanized rubber, as is more particularly described in an application for patent made simultaneously with the application for this.

The quantity of the oil employed is not rigid, but may be considerably varied without altering materially the result attained. I do not therefore confine myself to the exact proportions or quantities given above, though these I have found to accomplish the object which I have in view.

I am aware that the molds in which articles of hard rubber have been vulcanized have been rubbed with olive-oil to prevent the adhesion of the material; but this will not accomplish the end which I have in view, and I do not lay claim to such use of the oil.

What I do claim as my invention, and desire to secure by Letters Patent, is—

The use of olive-oil, when incorporated with other materials, in the manufacture of hard vulcanized rubber, as described, for the purpose specified.

THOS. J. MAYALL.

Witnesses:
 THOS. R. ROACH,
 P. E. TESCHEMACHER.